United States Patent

Enzinna

[11] Patent Number: 5,984,225
[45] Date of Patent: Nov. 16, 1999

[54] COMPENSATING TENSIONING MECHANISM FOR FILM VALVE

[75] Inventor: Donald John Enzinna, Lockport, N.Y.

[73] Assignee: General Motors Corporation, Detroit, Mich.

[21] Appl. No.: 09/103,192

[22] Filed: Jun. 23, 1998

[51] Int. Cl.[6] ............ B65H 23/18; F16K 31/04; B60H 1/32; F24F 7/00
[52] U.S. Cl. ............ 242/415.1; 242/538.1; 242/334; 251/129.11; 251/901; 62/244; 236/49.3; 185/40 R
[58] Field of Search ............ 242/415, 415.1, 242/334, 352, 538.1; 251/129.11, 901; 62/239, 244; 236/49.3; 185/40 R

[56] References Cited

U.S. PATENT DOCUMENTS

| | | | |
|---|---|---|---|
| 4,438,781 | 3/1984 | Brenholt | 251/901 |
| 5,160,115 | 11/1992 | Ito et al. | 251/129.12 |
| 5,243,830 | 9/1993 | Ito et al. | 251/901 |

*Primary Examiner*—John Q. Nguyen
*Attorney, Agent, or Firm*—Patrick M. Griffin

[57] ABSTRACT

A roller drive mechanism for an automotive HVAC film valve belt includes a single motor type drive that automatically compensates for continually differing belt wind up and wind off rates, while maintaining at least a minimal belt tension, and without the necessity for precise adjustment. A central motor drive shaft is split between a fixed end and a yieldable, slidable end. The two ends can turn at the same rate from the single motor, but the ability of the second end to slide back and forth allows one roller to match its belt handling rate to the other roller automatically, while the always stretched spring maintains a certain minimum belt tension, while also accommodating adjustment tolerances.

3 Claims, 3 Drawing Sheets

COMPENSATING TENSIONING MECHANISM FOR FILM VALVE

TECHNICAL FIELD

This invention relates to automotive ventilation and air conditioning system film valves in general, and specifically to a tensioning mechanism therefor that compensates for differential rates of belt wind up and wind out.

BACKGROUND OF THE INVENTION

Automotive ventilation and air conditioning systems have historically used air duct opening and closing valves that were swinging doors or flaps. Besides the volume inevitably occupied by such a valve just to accommodate its swinging motion, they present problems in their lack of ability to gradually apportion air flow into or through an opening. By their very nature, such valves tend to be completely open or closed, rather than progressively moving between open and closed, in a predictable fashion. This is generally referred to as lack of linearity.

A newer, as yet not widely used, valve design uses a moving film belt that is shifted back and forth by winding it back and forth between a pair of parallel rollers. As the belt moves in one direction, it winds up on one roller and concurrently winds off of the other roller, and vice versa. An opening in the belt progressively covers and uncovers matching openings within the air flow housing, so as to give a predictable fractional flow, in addition to full on and full off. A thin, shifting belt is also potentially more compact than a series of swinging flaps. An inherent problem with a belt is that it is most convenient to turn both rollers with a single motor, which would generally turn both rollers at the same rate of rotation. However, except for an instant at the midpoint, one roller, either the roller that is winding up, or the roller that is winding off, will have a thicker layer of the belt wound around it than the opposite roller has. The instantaneous rate at which the belt is winding onto a rotating roller depends on the effective radius of the roller at the point where the belt is entering or the wound layer. This, in turn, depends on the thickness of the wound belt layer on the roller at that point in time, and is always changing. Maintaining a constant tension force in the belt depends, in turn, on the winding off roller matching its rate of belt wind out to the other roller's rate of wind up. Unless some means is provided to allow the rollers to match their wind up and wind off rates relative to one another, the belt will inevitably alternately slacken and tighten as it shifts back and forth between the two rollers. It would be possible, of course, to provide a complex control system, similar to tape recording machines, in which each roller can be independently driven when it serves as the wind up roller, and allowed to pull the other roller passively along with the tape, while providing an independently engageable drag mechanism on the wind off roller. However, a simple, single drive motor system would be much more desirable and economical.

This problem has been recognized, and at least one single motor drive mechanism to allow a tension compensating differential rate of rotation between the wind up and wind off rollers has been disclosed in U.S. Pat. No. 5,243,830. There, each roller is paired with a co axial, co rotating conical pulley located at one end, which is oppositely oriented relative to the conical pulley on the other roller. One roller and pulley pair is directly motor driven, while the other is indirectly driven by the first, either through the film or the wire. In one direction, the film is in tension and serves as the opposite roller driving means, while the wire is slack, and vice versa. Within each rollerpulley pair, as the belt winds up more thickly, the wire moves to a smaller pulley radius, and vice versa. Since the conical pulleys are oppositely directed, as the effective radius of one is growing, the other is contracting, and vice versa. The belt winds in the opposite direction of the wire, so that the winding up roller with its thickening wound layer of belt can rotate more slowly as the winding off roller with its thinning wound layer of belt compensates by rotating more quickly. While the mechanism does work with only one motor, it is somewhat complex, with its extra wires and pulleys. Moreover, the mechanism is very sensitive to misadjustment. Unless the counter rotating rollers and pulleys are timed and registered to one another precisely, the wire will not finish winding up simultaneously with the belt winding off, and vice versa. Repair and adjustment within the small, confined spaces available is very difficult. As a consequence, in actual production, the opposed tapers on the pulleys were eliminated in favor of non tapered pulleys. The non tapered pulleys were still used in order to allow one motor to run both rollers, but a conventional window shade type torsion spring was used to provide for wind up—wind off rate matching between the rollers.

SUMMARY OF THE INVENTION

The invention provides a less complex and more "forgiving" system to match roller wind up and wind off rates, while driving the rollers with a single motor and still maintaining a sufficient belt tension.

In the preferred embodiment disclosed, first and second parallel rollers are rotated by a worm gear driven wheel. The belt extends between the rollers, being wound onto one and wound off of the other alternately. Any force tending to turn the rollers relatively apart increases belt tension between the rollers, and vice versa. Each worm gear is turned by a central drive shaft from a single motor. A first worm gear is driven directly by the drive shaft, while the second worm gear is driven indirectly, through a torsionally stiff, but axially yieldable, tension spring. When the belt is at a mid point, wound onto each roller in an equally thick layer, the wheels and worm gears are set so that the spring is stretched to a certain minimum degree. The spring's stretch, by tending to pull the worm gears relatively together, tends also to turn the rollers relatively apart and put a basic, minimal tension in the belt. Conversely, an increase in belt tension can stretch the spring and cause the second worm gear to slide axially away from the first, and vice versa.

Because of its ability to slide axially back and forth with the stretching spring, the auxiliary shaft and second worm gear can, even as it turns at the same rate as the first, allow a different rate of rotation for the second wheel and roller than it would allow if the shaft were not axially yieldable. This allows the second roller to conform either its belt wind off rate or its wind up rate to the corresponding rate of the constantly rotating first wheel and roller. At the same time, at least the basic, minimal belt tension is maintained, without belt slack, by the stretched spring. The mechanism does not need a precise adjustment to work, since a slightly greater or lesser spring stretch at the mid point belt position will still allow the spring to stretch out farther as needed, but will not over or under tension the belt as the second worm gear slides back and forth.

BRIEF DESCRIPTION OF THE DRAWINGS

These and other features of the invention will appear from the following written description, and from the drawings, in which.

DESCRIPTION OF THE PREFERRED EMBODIMENT

Figure 1:
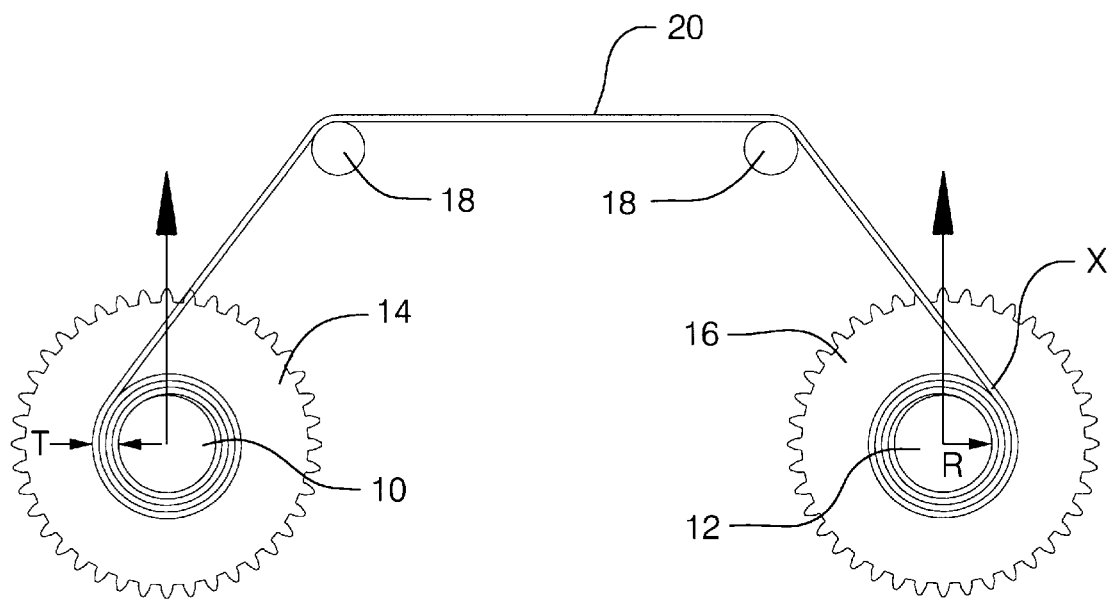
FIG. 1 is a view of just a pair of rollers and wheels with a belt wound equally onto each, with arrows to indicate a relative rotated position of the two rollers.
Figure 2:
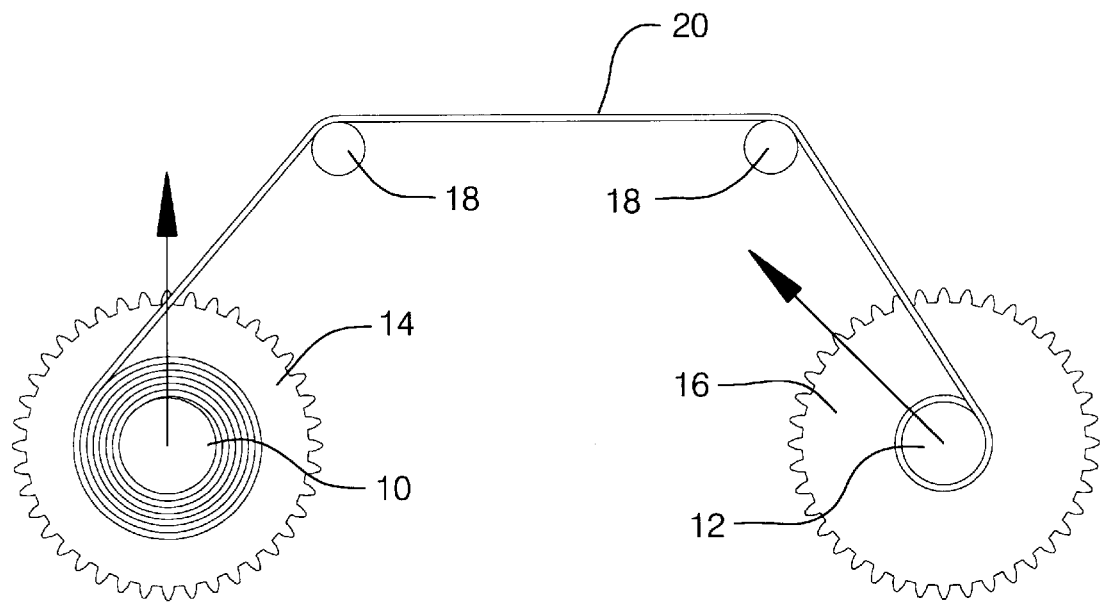
FIG. 2 shows the belt wound up fully onto the first roller and off of the second, and with the second roller having turned relatively toward the first in the process of having matched its wind off rate to the first roller's wind up rate.
Figure 3:
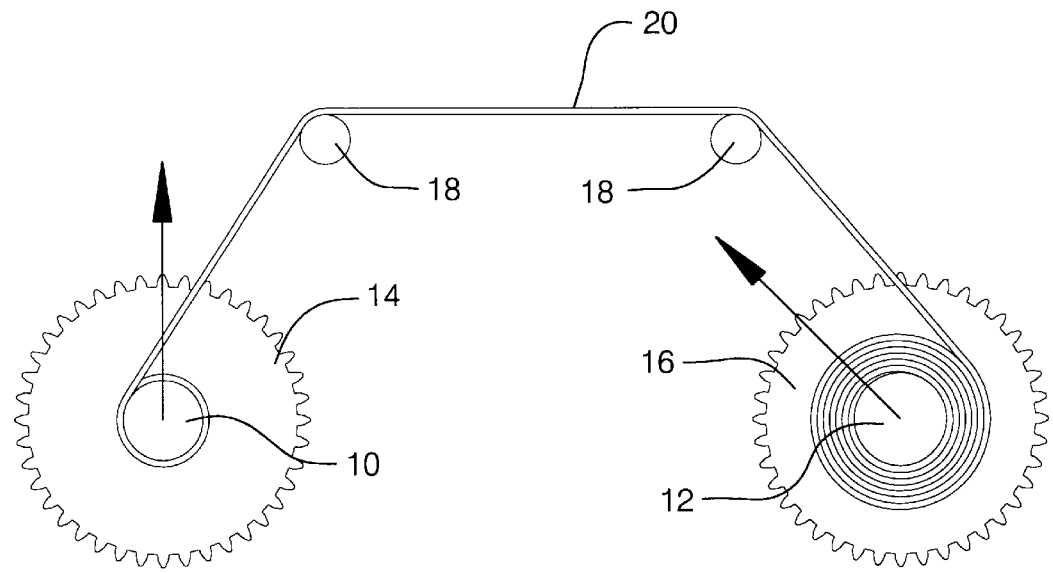
FIG. 3 shows the converse situation, with the belt wound off of the first roller and onto the second, and with the second roller also having turned relatively toward the first, but now as a result of having matched its wind up rate to the to the first roller's wind off rate.

Referring first to FIGS. 1 through 3, a pair of rollers, designated as a first roller 10 and a second roller 12, are supported to turn about parallel axes, rotated by first and second toothed wheels 14 and 16. The center axes about which the rollers 10 and 12 rotate are fixed relative to one another. A pair of fixed idler rollers 18 support a length of film belt 20 that runs between the rollers 10 and 12, alternately winding up on one and off of the other. The belt 20 is shown wound equally onto each roller in FIG. 1, a so called midpoint position. Belt 20 is wound all onto the first roller 10 in FIG. 2, and all onto the second roller 12 in FIG. 3. In FIG. 1, vertical arrows in the nature of clock hands indicate a relative "starting" position for the rollers 10 and 12, arbitrarily, but conveniently, chosen to be the mid point belt position. The rate at which the belt 20 winds onto or off of either roller 10 and 12 will be a function of the rotation rate, which can be considered a constant with time, and also a function of the effective lever arm through which the rotation rotating roller acts, which varies over time. The effective lever arm is a function of the radius at point X, the tangency point at which belt 20 feeds into the belt layer wound onto the roller at any point it time. The radius at point X is the basic radius of the rollers 10 and 12, indicated at R, plus the changing belt layer thickness T. Belt 20 is put into tension by forces tending to rotate the rollers 10 and 12 relatively apart, that is, by forces tending to rotate first roller 10 counterclockwise relative to second roller 12, or to rotate second roller 12 clockwise relative to first roller 10. The reverse is true, as well, in that belt tension can be reduced by forces tending to rotate the rollers 10 and 12 relatively toward each other. Specifically, forces tending to rotate first roller 10 clockwise relative to the second 12, or to rotate the second 12 counterclockwise relative to the first 10 will tend to reduce belt tension. The invention achieves the converse of that. That is, an increase in belt tension causes the rollers 10 and 12 to move relatively toward one another, which, in turn, allows the rollers 10 and 12 to match their wind up and wind off rates to one another, while maintaining at least a minimum belt tension.

Referring next to just FIGS. 1 and 2, the situation in which belt 20 winds off of second roller 12 and onto first roller 10 is illustrated. The position of the wheels 14 and 16 in the mid point belt position of FIG. 1 is indicated by two vertical arrows, in FIG. 1, representing an arbitrary, but common, starting position for the two rollers 10 and 12. In FIG. 2, roller 10 has wound up as much of belt 20 as can be wound up, and roller 12 has correspondingly wound off as much as can be. The new position of the arrows indicates not an absolute position per se, but rather the fact that the second roller-wheel pair 12–16 has rotated relatively toward the first roller-wheel pair 10–14. That is, as the belt 20 has wound onto the constantly rotating roller 10, and as the effective radius has thereby grown and pulled the belt 20 faster and more forcefully off of the other, winding off roller 12, the second roller-wheel pair 12–16 has been able to turn relatively toward the first roller-wheel pair 10–14, so as to compensate for the wind up-wind off rate differential.

Referring next to just FIGS. 1 and 3, the converse situation in which belt 20 winds onto second roller 12 and off of first roller 10 is illustrated. In FIG. 3, roller 12 has wound up as much of belt 20 as can be wound up, and roller 10 has correspondingly wound off as much as can be. Even though the wind up-wind off designation has switched from FIG. 2, it is still the second roller-wheel pair 12–16 that is shown as having turned relatively toward the first roller-wheel pair 10–14 to mach the wind up-wind off rates. Theoretically, it is arbitrary which turns toward the other, since it is the relative differential that counts, but it is the second roller-wheel pair 12–16 that is illustrated as having turned toward the first pair 10–14 in each case, because of the operation of the torque transmission mechanism that actually rotates each, described next.

Figure 4:
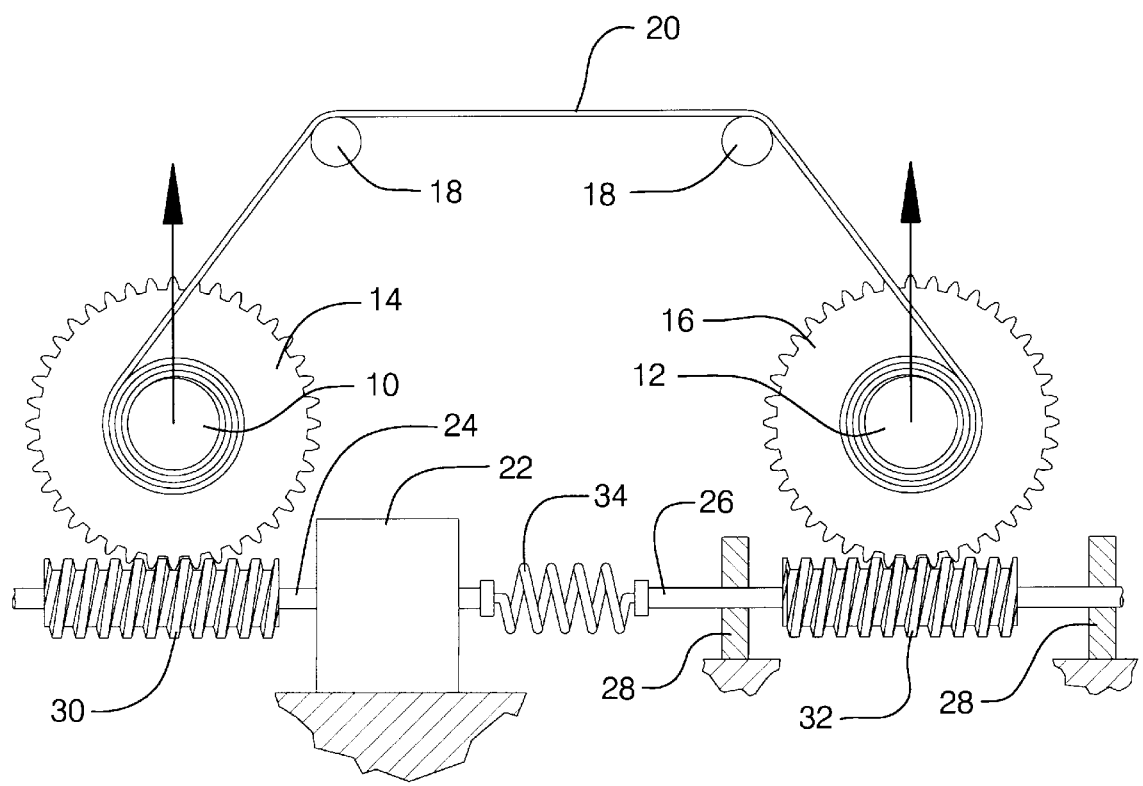
FIG. 4 shows the drive mechanism of the invention with the rollers in the FIG. 1 position.

Referring next to FIG. 4, the compensating tensioning mechanism of the invention includes, besides the structures already described above, a single, fixed motor 22 which turns a central, primary drive shaft 24. An auxiliary drive shaft 26, coaxial to the primary, is supported to rotate or to slide axially back and forth by a pair of fixed bearings 28. A first worm gear 30 fixed to the end of primary drive shaft 24 rotates first wheel 14 in either direction as shaft 24 turns in either direction. A like threaded second worm gear 32 fixed to auxiliary drive shaft 26, between the bearings 28, rotates second wheel 16 in either direction as shaft 26 turns. The two shafts 24 and 26 are interconnected by a torsionally stiff, but axially yieldable coil spring 34. Spring 34 is able to translate torque from primary shaft 24 to auxiliary shaft 26 substantially without rotational lag, but is able to stretch back and forth, at least within the limits allowed by the clearance between the bearings 28 and the ends of the second worm gear 32. The components are set relative to each other so that, in the mid point belt position shown in FIG. 4, spring 34 has a certain minimal or basic degree of stretch and is under tension, tending to contract. As a consequence, the second worm gear 32 is being continually axially pulled toward the opposite worm gear 30, which biases the wheels 14 and 16 so as to turn apart from each other. This imparts a basic, minimal tension to the belt 20. Conversely, an increase in belt tension 20 would bias the wheels 14 and 16 away from each other, and tend to stretch the spring 34 more. The mechanism does not need precise "setting," in that the second worm gear 32 could be shifted back or forth, relative to the second wheel 16, by one or two teeth, which would stretch the spring 34 slightly less or slightly more, but would still impart a basic tension to the belt 20

Figure 5:
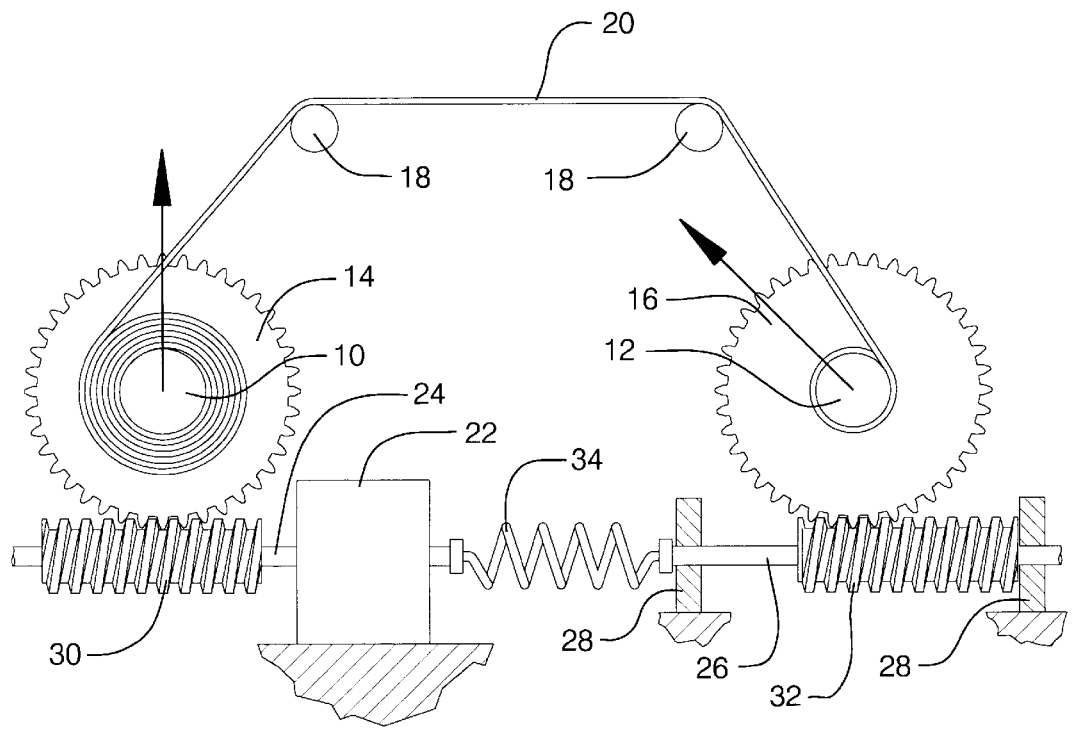
FIG. 5 shows the drive mechanism with the rollers in the FIG. 2 position.

Referring next to FIGS. 4 and 5, the position of the various components of the mechanism after the belt 20 has been shifted to the left is illustrated. The first roller 10-wheel 14 pair, as it has been rotated at a constant rate counter-clockwise by the first worm gear 30 and axially rigid primary shaft 24, has wound up the belt 20 and thereby pulled it to the left. Concurrently, the auxiliary shaft 26 has turned one to one with the primary shaft 24, through the spring 34, but has not turned the second wheel 16 at exactly the same rate as the first wheel 14. The instantaneous belt wind up rate onto first roller 10 increases with time, as the wound layer thickness and effective lever arm increases, and the consequent acceleration in belt motion is experienced as an increased force, meaning tension, in the belt 20. That increased belt tension, in turn, has acted to stretch spring 34, and thereby allowed second worm gear 32 to shift axially to the right. By shifting to the right, the second worm gear 32, although remaining engaged with the teeth of the second wheel 16, has effectively allowed the second wheel 16 and roller 12 to turn counterclockwise farther (and relatively faster over time) than they would have turned had second worm gear 32 not been able to shift axially. The net effect is that the second roller 12 has matched its effective wind off rate to the wind up rate of the first roller 10. Belt tension has increased with the stretch of spring 34, but not enough to damage belt 20.

Figure 6:
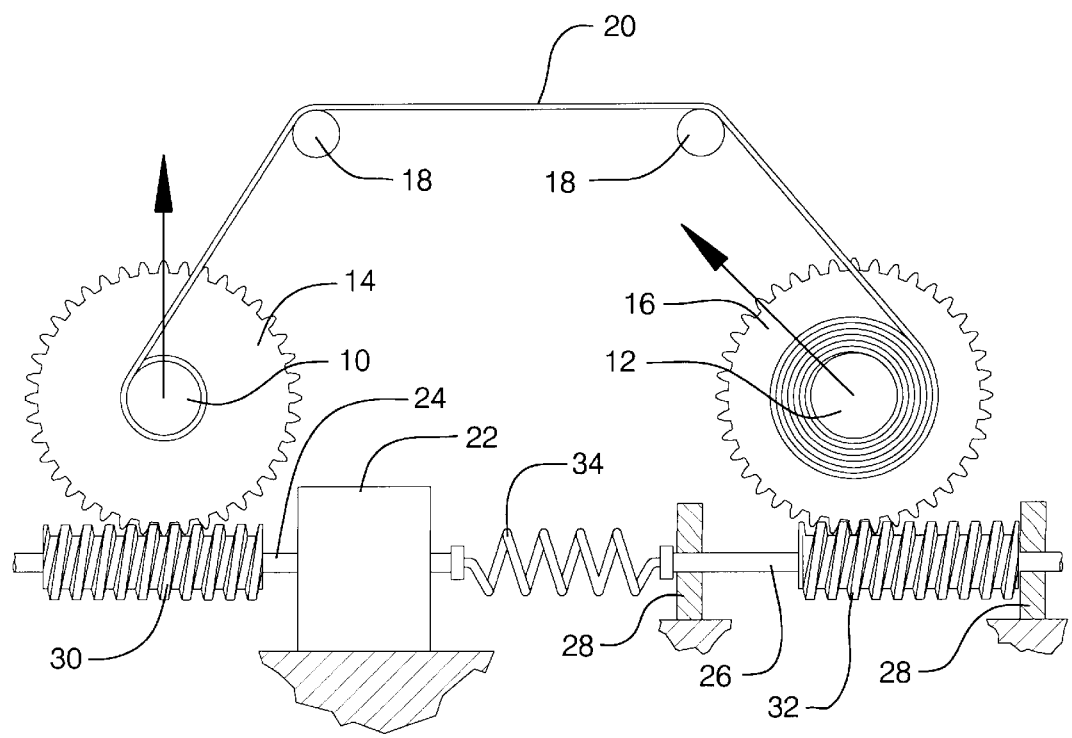
FIG. 6 shows the drive mechanism with the rollers in the FIG. 3 position.

Referring next to FIGS. 4 and 6, the position of the various components of the mechanism after the belt 20 has been shifted to the right is illustrated. The second roller 12-wheel 16 pair, as it has been rotated at a clockwise by the second worm gear 32 and auxiliary shaft 26, has wound up the belt 20 and thereby pulled it to the right. Concurrently, the first worm gear 30 has turned at a constant rate clockwise with the primary shaft 24. This has turned the first wheel 14 and first roller 10 at a constant rate to wind off the belt 20 being wound up by the second roller 12. However, the second roller 12, now acting as the wind up roller, also increases its instantaneous belt wind up rate as its wound layer thickness and effective lever arm increases, with the same acceleration in belt motion and increase in belt tension. As before, that increased belt tension, in turn, has acted to stretch spring 34, and thereby allowed second worm gear 32 to shift axially to the right. Now, however, by shifting to the right, the second worm gear 32 has effectively allowed the second wheel 16 and roller 12 to turn less far clockwise than they would have turned had second worm gear 32 not been able to shift axially to the right. The net effect now is that the second roller 12 has been able to lag the first roller 10 to match the belt wind up and wind off rates between the two. Again, belt tension has increased with the stretch of spring 34.

In conclusion, while the belt is rolled back and forth with a single motor and shaft, the ability of the shaft to stretch and thereby allow the two rollers to rate match prevents binding of the system while maintaining belt tension at all times at least a minimal value. The mechanism is somewhat forgiving, and need not be precisely set. Variations in the disclosed embodiment could be made. Mechanisms other than the worm gears and wheels could be used to directly rotate the rollers, so long as they could be driven by each end of a single shaft driven by a single drive source. Some other torsionally stiff, but axially yielding, tension means could be provided in the drive shaft, such as a shaft made of a material that was itself stretchable, or such as a shaft with two intermitted ends, keyed together for one to one rotation, but held axially together by a resilient, stretchable medium. The tension means could be configured to be at substantially a zero tension at the mid point position, but without substantial belt slack at that point, so as to provide a greater capacity to stretch out and back, and thereby accommodate more belt. Therefore, it will be understood that it is not intended to limit the invention to just the embodiment disclosed.

I claim:

1. A compensating tensioning mechanism for moving a film belt back and forth, comprising in combination, a first roller and a second roller having a length of belt wound on and between the roller, and adapted to alternately wind up and wind out the belt to move the belt back and forth between the rollers, so that rotation of the rollers relatively apart tends to increase belt tension and rotation of the rollers relatively together tends to decrease belt tension, a rotating torque transmission mechanism having a shaft lying on a common shaft axis and adapted at respective ends of the shafts to concurrently rotate the rollers back and forth in the same direction as the shaft rotates in either direction, so as to alternately wind up and wind out the belt, and a torsionally stiff but axially yieldable tension means in the transmission mechanism lying between the shaft ends, said tension means is under least stretch when the belt is in a mid position and wound substantially equally onto each roller, the tension means also being adapted to be stretched farther in response to a greater belt tension, and thereby allow the two shaft ends to move relatively apart to in turn allow the two rollers to rotate relatively together, whereby, starting from the mid position, as the torque transmission mechanism rotates at a substantially constant rate so as to rotate the shaft in either direction and cause either roller to wind up more belt as the other roller winds off more belt, and as the roller winding up accumulates a thicker layer of belt that the roller winding off, so as to increase the instantaneous belt wind up rate and thereby increase the belt tension, the axially yieldable tension means can stretch beyond said mid position so as to allow the two shaft ends to rotate at differing rates and thereby allow the rollers to match respective wind up and wind out rates.

2. A compensating tensioning mechanism for moving a film belt back and forth, comprising in combination, a first roller and a second roller having a length of belt wound on and between the rollers, and adapted to alternately wind up and wind out the belt to move the belt back and forth between the rollers, so that rotation of the rollers relatively apart tends to increase belt tension and rotation of the rollers relatively together tends to decrease belt tension, a rotating torque transmission mechanism having a shaft lying on a common shaft axis and adapted at respective ends of the shaft to concurrently rotate the rollers back and forth in the same direction as the shaft rotates in either direction, so as to alternately wind up and wind out the belt, and a torsionally stiff but axially yieldable tension means in the transmission mechanism lying between the shaft ends, said tension means is under a predetermined tension when the belt is in a mid position and wound substantially equally onto each roller, thereby tending to pull the ends of shaft together and rotate the rollers relatively apart to maintain the belt under a minimal tension, the tension means also being adapted to be stretched farther in response to a greater belt tension, and thereby allow the two shaft ends to move relatively apart to in turn allow the two rollers to rotate relatively together, whereby, starting from the mid position, as the torque transmission mechanism rotates at a substantially constant rate so as to rotate the shaft in either direction and cause either roller to wind up more belt as the other roller winds off more belt, and as the roller winding up accumulates a thicker layer of belt that the roller winding off, so as to increase the instantaneous belt wind up rate and thereby increase the belt tension, the axially yieldable tension means can stretch beyond said mid position so as to allow the two shaft ends to rotate at differing rates and thereby allow the rollers to match respective wind up and wind out rates.

3. A compensating tensioning mechanism for moving a film belt back and forth between a first and second roller that alternate between providing film wind up and film wind out function, comprising in combination, a first wheel associated with the first roller and a second wheel associated with the second roller so as to turn their respective rollers one to one as the wheels turn, a first and second worm gears associated with the respective wheels so as to turn the respective wheels, the worm gears being aligned on a common axis, a fixed motor located between the worm gears with a primary drive shaft coaxial to the common axis, the primary drive shaft being directly connected on one side to the first worm gear and indirectly connected to the second worm gear on the other side through an axially slidable auxiliary drive shaft coaxial with the common axis, and a torsionally stiff but axially yieldable spring interconnecting the primary and auxiliary drive shafts such that the spring is stretched and under tension when the belt is in a mid position and wound substantially equally thickly onto each roller, said spring thereby continually tending to contract along the axis and rotate the wheels relatively apart so as to keep the belt continually under a minimal, mid position tension, and in which the spring is capable of being stretched farther in response to an increasing belt tension, so as to allow the two shafts and worm gears to slide relatively axially apart along the common axis and thereby allow the two wheels to rotate relatively together, whereby, starting from the mid position, as the primary shaft directly rotates the first worm gear, wheel and roller at a given rotational speed and in a direction that winds more of the film belt onto the first roller, the auxiliary shaft concurrently turns the second worm gear and wheel, through the spring, in the same direction, so as to concurrently wind more of the film belt off of the second roller, and as the instantaneous belt wind up rate on the first roller increases as a thicker layer of belt is accumulated on the first roller, thereby increasing belt tension, the spring is stretched, thereby allowing the second wheel to rotate relatively toward the first so as to match the second roller's belt wind off rate to the first roller's wind up rate, and, conversely, starting from the mid position, as the primary shaft indirectly rotates the second worm gear, wheel and roller in the opposite direction, through the spring and auxiliary shaft, so as to wind up more of the film belt on the second roller, and concurrently directly rotates the first worm gear, wheel and roller in the same direction so as to wind more of the film belt off of the first roller, and as the instantaneous belt wind up rate on the second roller increases as a thicker layer of belt accumulates on the second roller, thereby increasing belt tension, the spring is stretched, thereby allowing the second wheel to rotate relatively toward the first wheel so as to match the second roller's belt wind up rate to the first roller's wind off rate.

* * * * *